United States Patent
Schultz et al.

[11] Patent Number: 5,992,085
[45] Date of Patent: Nov. 30, 1999

[54] FISHING RIG FOR SQUID AND METHOD

[76] Inventors: Benjamin I. Schultz; Leslie Ann Thomas, both of 3706 N. Ocean Blvd., Suite 352, Fort Lauderdale, Fla. 33308

[21] Appl. No.: 08/939,392

[22] Filed: Sep. 29, 1997

[51] Int. Cl.[6] .......................... A01K 85/00; A01K 83/06
[52] U.S. Cl. .............................. 43/44.2; 43/44.8; 43/42.5
[58] Field of Search ................................... 43/42.5, 44.2, 43/44.6, 44.8, 42.06

[56] References Cited

U.S. PATENT DOCUMENTS

| | | | |
|---|---|---|---|
| D. 175,926 | 11/1955 | Barr | 43/42.5 |
| 2,476,126 | 7/1949 | Weiss | 43/44.2 |
| 2,632,276 | 3/1953 | Hale | 43/42.52 |
| 2,733,534 | 2/1956 | Mallory | 43/42.5 |
| 3,284,945 | 11/1966 | Kurtis | 43/44.2 |
| 3,289,345 | 12/1966 | Reininger | 43/42.5 |
| 3,521,395 | 7/1970 | Klemkowski, Jr. | 43/44.6 |
| 3,738,049 | 6/1973 | Garza | 43/44.4 |
| 3,760,526 | 9/1973 | Hicks | 43/44.4 |
| 3,839,814 | 10/1974 | Sykora | 43/44.2 |
| 3,893,255 | 7/1975 | Hicks | 43/41 |
| 3,905,149 | 9/1975 | McCloud | 43/44.2 |
| 4,233,771 | 11/1980 | Robinson | 43/41 |
| 4,349,979 | 9/1982 | Strantz | 43/44.8 |
| 4,839,983 | 6/1989 | Pippert | 43/42.5 |
| 4,850,132 | 7/1989 | Motyka | 43/44.2 |
| 5,094,026 | 3/1992 | Correll et al. | 43/42.28 |
| 5,611,168 | 3/1997 | Schultz et al. | 43/44.6 |

*Primary Examiner*—Kurt Rowan
*Attorney, Agent, or Firm*—Oltman, Flynn & Kubler

[57] ABSTRACT

A squid mounting rig for shaping and securing the body of a dead squid having a squid body tubular portion and squid tentacles for fishing includes a squid body mounting structure for insertion longitudinally into the squid body tubular portion, the mounting structure having lateral extent for laterally filling out the squid body, a fishing hook mounting structure and a fishing line engagement structure, and a fishing hook connected to the fishing hook mounting structure. The hook preferably includes a hook eyelet and the mounting structure preferably includes a plate body having a plate forward end including the fishing line engagement structure in the form of a fishing line-passing port and having a plate rearward end including the hook mounting structure in the form of a hook eyelet-passing port. The plate rearward end is preferably beveled. The plate forward end preferably has tapered shoulder edges terminating in a forwardly extending elongate stem portion including the fishing line-passing port. Tabs may be cut and bent outwardly from the plate body to distend the squid body in a perpendicular direction as well. The plate body may be formed of a dull-surfaced metal or a dull-surfaced plastic. A method of mounting a squid body includes a squid body tubular portion onto the above-described rig, including the steps of inserting the mounting structure longitudinally into the squid body tubular portion, and securing a fishing line to the line engagement structure.

7 Claims, 2 Drawing Sheets

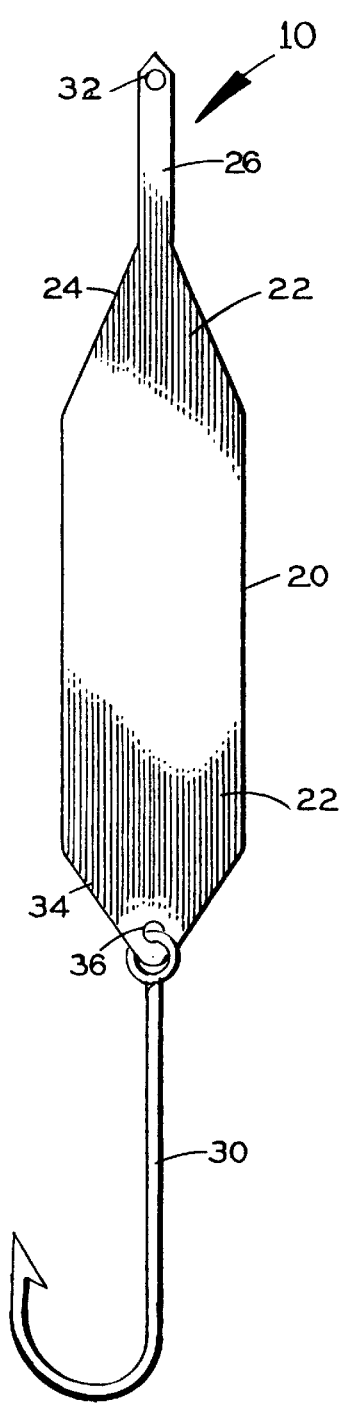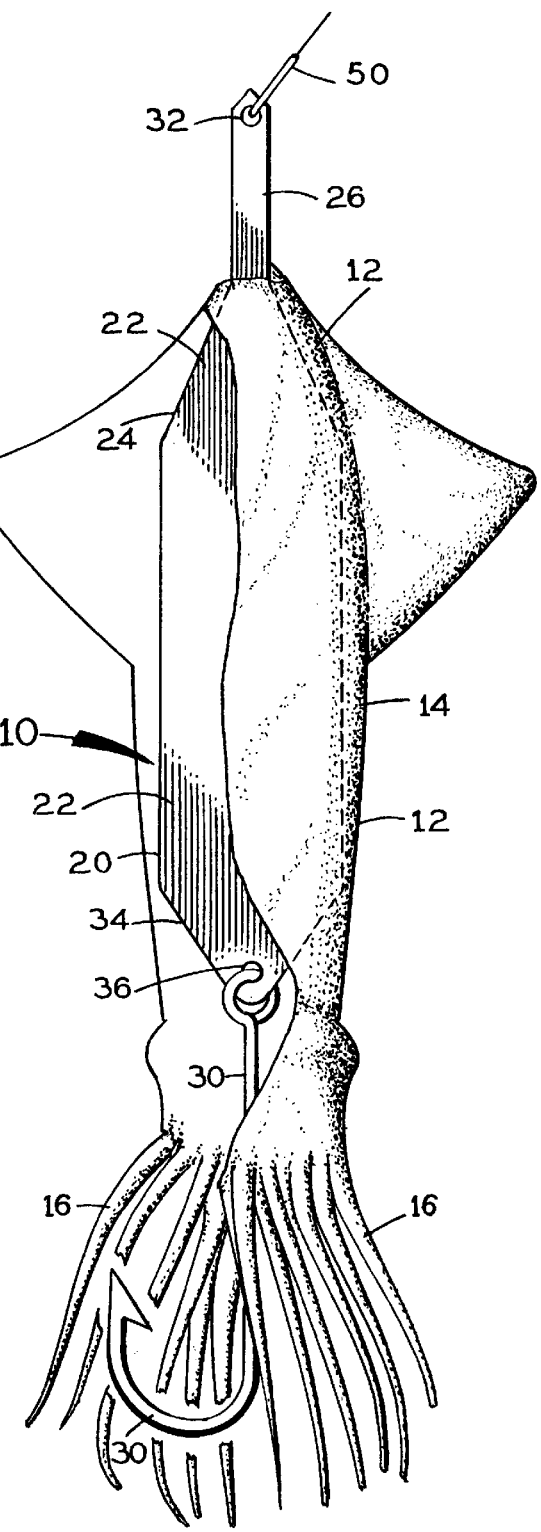
FIG.1   FIG.2   FIG.3

FISHING RIG FOR SQUID AND METHOD

BACKGROUND OF THE INVENTION

1. Field of the Invention

The present invention relates generally to the field of fishing equipment and bait securing devices. More specifically the present invention relates to a rig including a mounting structure for fitting within and thereby laterally distending and shaping the tubular portion of the body of a dead squid. The mounting structure preferably includes a strip-shaped plate having a plate body with parallel longitudinal edges and a plate forward end having tapered shoulder edges terminating in a forwardly extending elongate stem portion containing a line-passing port, and a plate rearward end with a V-shaped bevel terminating in a point and having a hook-engaging port fitted with the eyelet of a fishing hook. The plate body, exclusive of the stem portion, is sized to extend substantially the full length of the squid body tubular portion and to laterally spread the squid body to life-like proportions. The plate is made of a non-shiny material such as a dull-surfaced metal or plastic, so that the plate is inconspicuous to game fish.

A method of using the rig is also provided in which the plate is inserted longitudinally into the forward end of the squid body tubular portion, plate forward end first, until the elongate stem portion protrudes through the rearward end of the squid body, filling out the squid body to look life-like. The trailing squid tentacles help conceal the hook from the view of pursuing game fish. A fishing line is looped through the line-passing port and tied. The squid body and plate combination is then towed through the water to attract fish, according to the sport of trolling.

2. Description of the Prior Art

There has long been tackle for attracting and hooking game fish. This equipment includes lures, which are typically rigid structures of chrome-plated steel or of shiny plastic fitted with hooks for drawing the attention of nearby fish. A problem with lures is that their distinctly man-made appearance often makes game fish wary and unwilling to approach. Various bait mounting devices have been provided as well, but these generally either mount only a fragment of a bait fish having no particular shape, or they contain an entire bait fish and have substantial apparatus protruding around the bait fish in plain view.

An example of the latter is that of Garza, U.S. Pat. No. 3,738,049, issued on Jun. 12, 1973, for a fishing hook and live bait harness. Garza discloses a spring wire assembly having an inverted U-shaped band portion for resiliently fitting over and engaging the back and sides of a bait fish, and having wire ends configured as fishing hooks positioned against and resiliently abutting each side of the bait fish. A problem with Garza is that the entire apparatus is readily visible to targeted game fish, and it may alert them to potential danger.

Hicks, U.S. Pat. No. 3,760,526, issued on Sep. 15, 1973, teaches a holder for live shrimp or the like. Hicks includes a generally tubular flexible transparent shell for receiving within it a live bait shrimp. There is a longitudinal slot along the bottom of the shell through which the shrimp legs protrude and a leg-passing fork hatch structure which is removably secured over the slot. The shank of a relatively large hook is fastened to the top of the shell and extends backwardly so that the arc of the hook extends behind the tail of the shrimp, permitting tail movement. At the forward end of the hook shank is an eyelet for fastening the holder to a fishing line. A problem with Hicks is that most of the bait animal is contained and visually distorted within an apparatus shell, and the rearwardly protruding hook is highly conspicuous. Game fish likely would be reluctant to approach such a contraption.

Hicks, U.S. Pat. No. 3,760,529, issued on Sep. 25, 1973, and Hicks, U.S. Pat. No. 3,893,255, issued on Jul.8, 1975, reveal live bait holders. Similar in concept to the above-described Hicks apparatus for holding live shrimp, these devices provide a tubular shell for containing a fish. Openings are provided in the shell for fins to protrude, and the tail is exposed so that the bait fish can swim. The problems identified for the previous Hicks device are again presented.

Robinson, U.S. Pat. No. 4,233,771, issued on Nov. 18, 1980, discloses a bait holder. Robinson includes what is essentially a clip having an annular portion at its forward end for fitting snugly around the head of a bait fish and two opposing and rearwardly directed arm portions which extend along the sides of the fish. A barb or hook extends inwardly from the free end of each arm portion, and the arms resiliently press these barbs against the sides of the bait fish to help secure it within the holder. Fishing line passing ports and structures are provided along one of the arms and a fishing hook is tied to the trailing end of the fishing line, beside the tail of the bait fish. The problems of Hicks are again presented.

Schultz, et al., U.S. Pat. No. 5,611,168, issued on Mar. 18, 1997, teaches a fishing lure with teeth and body closure structure. Schultz, et al., includes a bait housing having upper and lower cylindrical half-jaws pivotally interconnected at their forward ends and biased with a spring to close together. Teeth project inwardly from the inside surfaces of the jaws to seize a piece of bait fish which is closed within the housing. Schultz, et al., is not intended and not designed for the mounting and exterior display of whole bait fish or squids, and cannot function in this way.

Correll, et al., U.S. Pat. No. 5,094,026, issued on Mar. 10, 1992, discloses a trolling squid lure. Correll, et al., is essentially a rubber squid having pivotally interconnected forward and rearward segments and a fishing hook concealed within trailing rubber tentacles. A problem with Correll, et al., is that game fish often recognize the differences between a synthetic animal and the real thing, and they can be spooked by a conspicuous imitation.

Klemkowski, U.S. Pat. No. 3,521,395, issued on Jul. 21, 1970, reveals a squid-primer including a triangular-shaped clamp attachable to a squid and slidably carried on a stainless steel leader having a loop connection at one end and a fishing hook at the other end. The squid is mounted on the leader during use. Problems with Klemkowski are that the triangular clamp is conspicuous to game fish and the apparatus does not fill out the body of the squid.

It is thus an object of the present invention to provide a fishing rig and method of use for securing the body of a bait squid for trolling, which fits into and distends the bait squid body to life-like proportions.

It is another object of the present invention to provide such a rig which is substantially concealed within the bait squid body so that pursuing game fish are not alarmed by the appearance of a man-made contrivance.

It is still another object of the present invention to provide such a rig which is connected to a fishing hook, the hook being substantially hidden within the squid tentacles.

It is finally an object of the present invention to provide such a rig which is sturdy, reliable and inexpensive to manufacture.

SUMMARY OF THE INVENTION

The present invention accomplishes the above-stated objectives, as well as others, as may be determined by a fair reading and interpretation of the entire specification.

A squid mounting rig is provided for shaping and securing the body of a dead squid having a squid body tubular portion and squid tentacles for trolling, including a squid body mounting structure for insertion longitudinally into the squid body tubular portion, the mounting structure having lateral extent for laterally filling out the squid body, a fishing hook mounting structure and a fishing line engagement structure, and a fishing hook connected to the fishing hook mounting structure.

The hook preferably includes a hook eyelet and the mounting structure preferably includes a plate body having a plate forward end including the fishing line engagement structure in the form of a fishing line-passing port and having a plate rearward end including the hook mounting structure in the form of a hook eyelet-passing port. The plate rearward end is preferably beveled. The plate forward end preferably has tapered shoulder edges terminating in a forwardly extending elongate stem portion including the fishing line-passing port. The plate body is preferably sized to extend substantially the full length of the squid body tubular portion, and the plate body and stem portion preferably have a dull surface to be inconspicuous to game fish.

The plate body may additionally include a cut-out tab portion bent to protrude from a face of the plate body for further expanding and shaping the squid body. The cut-out tab portion is preferably angled outwardly from the plate body and bent to angle back toward the plate body. The plate body may be formed of a dull-surfaced metal or a dull-surfaced plastic.

A squid mounting rig and dead squid combination is further provided, including a squid body having a tubular portion; a squid body mounting structure inserted longitudinally into the squid body tubular portion, the mounting structure laterally filling out the squid body tubular portion, a fishing hook mounting structure and a fishing line engagement structure, and a fishing hook connected to the fishing hook mounting structure.

A method is provided of mounting a squid body including a squid body tubular portion onto the above-described rig, including the steps of inserting the mounting structure longitudinally into the squid body tubular portion, and securing a fishing line to the line engagement structure.

BRIEF DESCRIPTION OF THE DRAWINGS

Various other objects, advantages, and features of the invention will become apparent to those skilled in the art from the following discussion taken in conjunction with the following drawings, in which:

FIG. 1 is a front view of the first embodiment of the squid mounting rig.

FIG. 2 is a side edge view of the first embodiment of the squid mounting rig.

FIG. 3 is a front view of the first embodiment of the rig fitted into a squid body, shown in cross-section, illustrating the size and positional relationships of the rig and hook to the squid body.

DETAILED DESCRIPTION OF THE PREFERRED EMBODIMENTS

Figures 4, 5, 6:
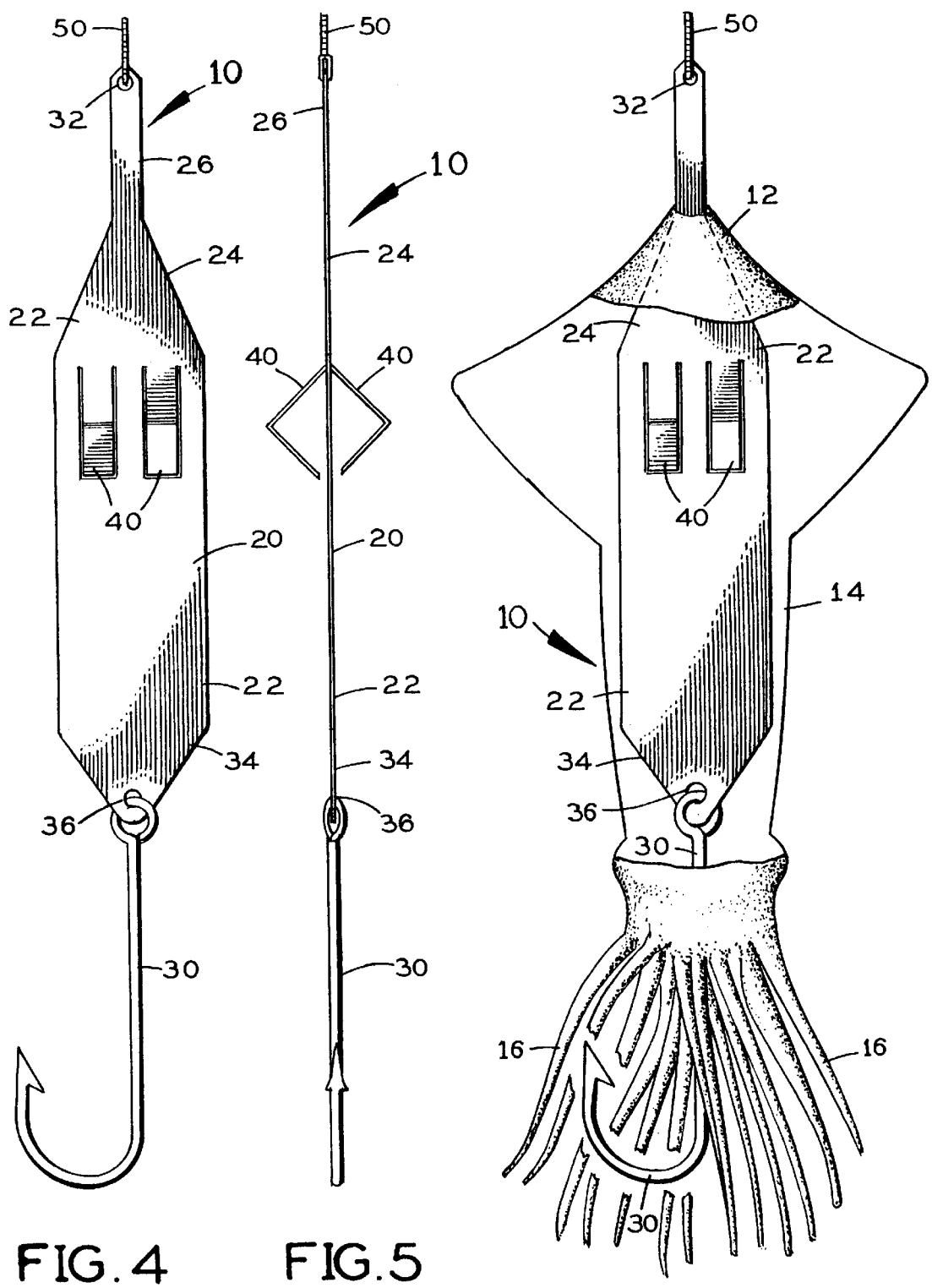
FIG. 4 is a front view of the second embodiment of the squid mounting rig, having the cut-out tabs.
FIG. 5 is a side edge view of the second embodiment of the squid mounting rig.
FIG. 6 is a front view of the second embodiment of the rig fitted into a squid body, shown in cross-section.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Referring to FIGS. 1–3, a rig is disclosed in the form of a squid mounting structure 10 for fitting within the body 12 of a dead squid, the squid body 12 including a tubular portion 14 and tentacles 16, for spreading, supporting and mounting squid body 12 so that the body 12 is made to look life-like and is fitted for fishing. The word fishing for purposes of this application is understood to include the sport of trolling.

Structure 10 preferably includes a strip-shaped plate 20 having a plate body 22 with parallel longitudinal edges and a plate forward end 24 having tapered shoulder edges terminating in an elongate stem portion 26 having a line-passing port 32, and plate rearward end 34 having a V-shaped bevel terminating in a point and a hook-passing port 36 fitted with the eyelet of a fishing hook 30. Plate body 22, exclusive of stem portion 26, is sized to extend substantially the full length of the squid body 12 and sized to laterally spread the body 12 to life-like proportions. Plate 20 is made of a non-shiny material such as a dull-surfaced metal or plastic, so that plate 20 is inconspicuous to game fish.

SECOND PREFERRED EMBODIMENT

The second embodiment is like the first except that lateral expansion tabs 40 are cut out of and bent relative to plate body 22 to angle outwardly from body 22, and then are bent again at each tab 40 mid-section to angle back toward plate body 22. See FIGS. 4–6. A tab 40 preferably protrudes out of each face of plate body 22 to expand the squid body 12 laterally in opposing directions, distending the squid body 22 along a third dimension. The knee bend of the tabs 40 permits sliding of a squid body 12 on and off plate body 22 without squid body 12 hooking on tabs 40.

METHOD

In practicing the invention, the following method may be used. Plate 20 is inserted longitudinally into the forward end of the squid body tubular portion 14, plate forward end 24 first, until elongate stem portion 26 protrudes through the rearward end of the squid body 12. The forward squid tentacles 16 help conceal hook 30 from pursuing game fish. Rig 10 pulls the squid body 12 backwardly, just as a live squid travels as it swims so that the illusion is convincing. A fishing line 50 is looped through line-passing port 32 and tied. The squid body 12 and plate 20 combination is then trolled through the water to attract game fish, or simply raised and lowered in the water repeatedly.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A squid mounting rig for shaping and securing the body of a dead squid having a squid body tubular portion and squid tentacles for fishing, comprising:

a squid body mounting structure for insertion longitudinally into the squid body tubular portion, said mounting structure comprising a plate body having lateral extent for laterally filling out the squid body, a plate forward end having opposing inwardly disposed tapered shoulder edges terminating in a forwardly extending generally rectangular, elongate stem, fishing line engagement means on said stem, and a fishing hook connected to said fishing hook mounting means;

said fishing hook comprises a hook eyelet and wherein said plate body further comprises a plate rearward end including said hook mounting means in the form of a hook eyelet-passing port;

said plate body additionally comprises a cut-out tab portion bent to protrude from a face of said plate body for further expanding and shaping the squid body;

said cut-out tab portion being angled outwardly from said plate body and bent to angle back toward said plate body;

said cut-out tab portion includes a free end and an attached end joined to the plate body at a location nearer said fishing line engagement means than said free end.

2. A squid mounting rig according to claim 1, wherein said plate rearward end is generally v-shaped and has beveled edges.

3. A squid mounting rig according to claim 1, wherein said plate body is sized to extend substantially the full length of the squid body tubular portion.

4. A squid mounting rig according to claim 1, wherein said plate body and elongate stem portion have dull surfaces to be inconspicuous to game fish.

5. A squid mounting rig according to claim 4, wherein said plate body is formed of a dull-surfaced metal.

6. A squid mounting rig according to claim 4, wherein said plate body is formed of a dull-surfaced plastic.

7. A squid mounting rig for shaping and securing the body of a dead squid having a squid body tubular portion and squid tentacles for fishing, comprising:

a squid body mounting structure for insertion longitudinally into the squid body tubular portion, said mounting structure comprising a plate body having lateral extent for laterally filling out the squid body, a plate forward end having opposing inwardly disposed tapered shoulder edges terminating in a forwardly extending generally rectangular, elongate stem, fishing line engagement means on said stem, and a fishing hook connected to said fishing hook mounting means;

said fishing hook comprises a hook eyelet and wherein said plate body further comprises a plate rearward end including said hook mounting means in the form of a hook eyelet-passing port;

said plate body additionally comprises a cut-out tab portion bent to protrude from a face of said plate body for further expanding and shaping the squid body;

said cut-out tab portion being angled outwardly from said plate body and bent to angle back toward said plate body in a plane substantially perpendicular to a plane containing said plate body so that said squid body does not hook on said tab portion.

* * * * *